F. J. SCHISLER.
TRAP NEST.
APPLICATION FILED MAY 4, 1912.
1,068,084.
Patented July 22, 1913.
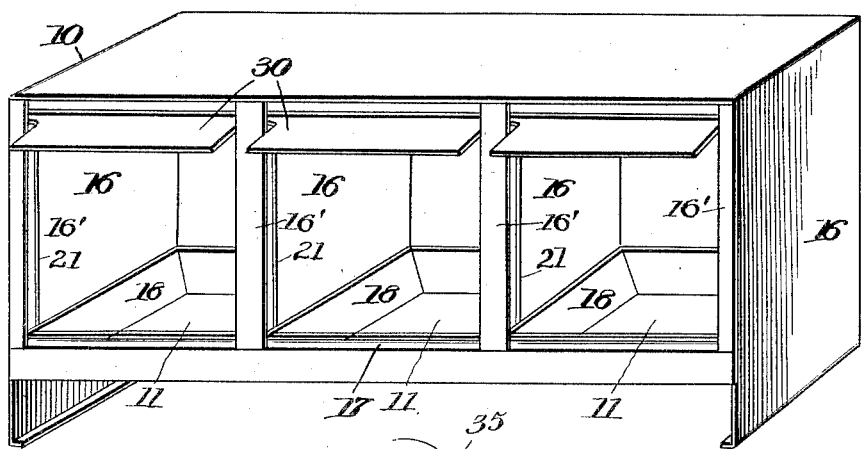
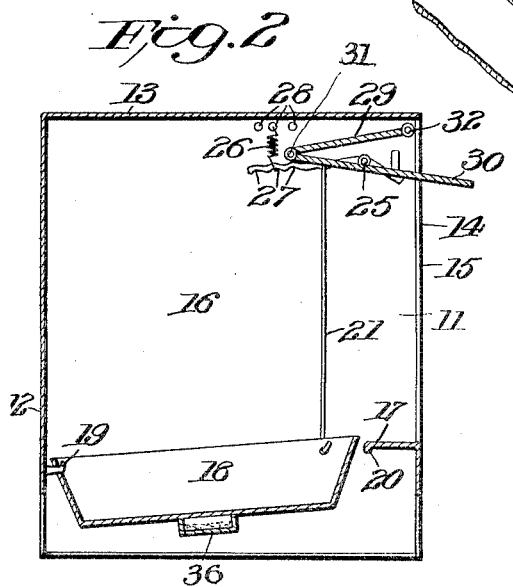
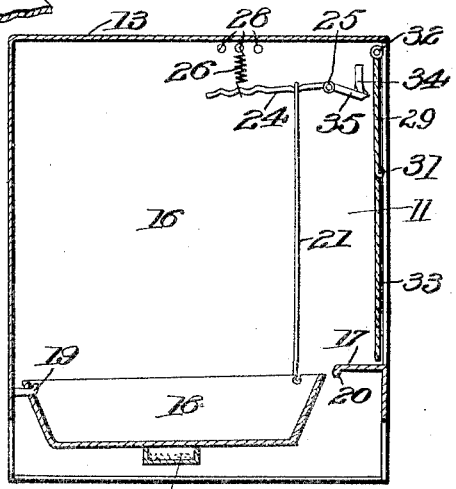
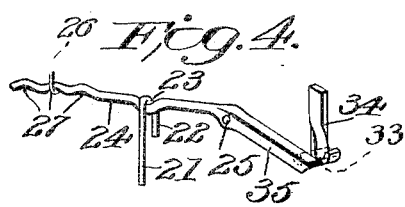
WITNESSES
M. E. Smith
H. Joseph Doyle
INVENTOR
Frank J. Schisler
By Hodges & Hodges
Attorneys

UNITED STATES PATENT OFFICE.

FRANK J. SCHISLER, OF WINTHROP, MINNESOTA.

TRAP-NEST.

1,068,084. Specification of Letters Patent. Patented July 22, 1913.

Application filed May 4, 1912. Serial No. 695,256.

*To all whom it may concern:*

Be it known that I, FRANK J. SCHISLER, a citizen of the United States, residing at Winthrop, in the county of Sibley and State of Minnesota, have invented new and useful Improvements in Trap-Nests, of which the following is a specification.

This invention relates to certain new and useful improvements in trap nests, being designed as an improvement upon the trap nest illustrated and described in Letters Patent Number 950,679, granted to me March 1, 1910.

One of the objects of the invention is to produce a trap nest which will be simple and inexpensive in construction, and which may be built entirely of sheet metal.

A further object is to produce a trap nest that will be sanitary and perfectly ventilated, and yet be protected from rats, mice, mink, or other animals or birds which usually prey upon nests.

A further object is to provide improved means whereby a hen is trapped the instant she enters the nest.

A further object is to provide improved means for adjusting the nest to be operated by hens of lighter or heavier weight, as the case may be.

A further object is to provide a trap nest that will be free of catches for setting the trapping device, and from which the hen may be readily released, the act of releasing the hen being designed to also accomplish the resetting of the trapping device.

A further object is to provide improved means for supporting the nest box within its housing.

The invention will be hereinafter fully set forth and particularly pointed out in the claims.

In the accompanying drawing: Figure 1 is a front view illustrating a trap nest unit embodying my present invention. Fig. 2 is a transverse sectional view illustrating the nest open with the trap set. Fig. 3 is a similar view after the trapping device has been dropped to close the nest. Fig. 4 is a detail of the trip device. Fig. 5 is a detail perspective view illustrating the trip device and its relation with the trapping member.

Referring to the drawing, 10 designates a unit of three, more or less, trap nests 11. Said unit is preferably constructed of sheet metal and provided with supporting standards, a closed rear wall 12, a closed top wall 13, and a front wall 14 provided with openings 15. Said unit is divided into three compartments by means of end walls and partitions 16 the front edges of which are provided with lateral flanges 16'. Each opening 15 is provided at its lower edge with a flange or sill 17 which serves as a support for the hen as the latter passes through the opening to the nest box 18. Said sill is preferably constructed of a strip of sheet metal secured in any suitable manner to the walls of the unit 10 and bent inwardly at 17 as shown. The nest box 18 is also constructed of sheet metal and provided with flaring ends and sides as shown, the rear end being pivotally supported by hooks 19 carried by the rear wall 12 and engaging suitable openings in the rear end of the nest box. It will be noted that there is a slight space between the sides of the nest box and the end walls or partitions 16, and a similar space between the ends of the box and the rear wall 12 and the downturned lip 20 on the flange or sill 17, respectively. These spaces afford ample ventilation around the nest box and yet are so small as to prevent mice, rats, minks, and other animals, or birds, which prey upon the nests from getting through.

The forward end of the nest box is supported by links 21 pivotally connected thereto at their lower ends the upper ends of each link being preferably of hook form, as indicated at 22, and adapted to engage a depression 23 in a trip member 24 pivotally supported by lug 25. The rear end of each trip member 24 is sustained by a spring 26, one end of which engages any one of a series of recesses or notches 27 in said trip member, the other end of the spring being constructed to engage a corresponding series of holes 28 formed in the contiguous end wall or partition 16. It will be understood, of course, that there is a link 21 on each side of the nest box near the forward end of the latter, and that there is a trip device 24, and adjuncts, for each link 21. The trapping member comprises a door formed of two members 29, 30, the members being pivotally connected at 31. The member 29 is pivotally supported at its upper edge by a rod 32 mounted in the end walls or partitions 16, and the member 30 is provided with laterally extended pins 33 which are adapted to rest in hook-like supports 34 secured to the end walls or partitions 16. The forward end of each trip member 24 is provided with an angular cam portion 35 which normally extends beneath the pins 33 when the latter are in engagement with the supports 34.

In practice, the nest is set by folding the trapping member, which can be accomplished by raising the lower end of the member 30 and placing the pins 33 in engagement with the hook-like supports 34, as illustrated in Fig. 2. When the hen enters the nest the additional weight upon the nest box depresses the forward end of the latter, rocking the trip members 24, and causing the cam portions 35 to raise the pins 33 out of engagement with the supports 34, whereupon the weight of the member 30 will cause said member and the member 29 to drop over the opening 15 behind flanges 16'. In this manner the hen is securely trapped and will be unable to pass out until the trapping member is folded by raising the member 30. In this connection it will be observed that the nest may be adjusted to conform to the average weight of the chickens using the same, by shifting the springs 26 toward or away from the pivots 25. If desired a disinfectant may be employed in which event the disinfecting material is placed in a suitable receptacle 36 secured in any suitable or preferred manner to the bottom of the nest box.

In addition to the foregoing it will be further noted that by reason of the supporting standards the nest unit is elevated above the floor or ground, thereby allowing of perfect ventilation; and it will also be observed that by reason of the construction illustrated and described the nest box may be readily disengaged from its supports to permit of cleaning or renewal of the parts.

A decided advantage is obtained by arranging the trapping member so as to drop behind vertical flanges, in that the hen is prevented from escaping until the door is opened from the outside, and her attention is not distracted by light entering the compartment at the level of the nest. This construction is also of obvious advantage for detaining or holding sitting hens.

Having thus explained the nature of my invention and described an operative manner of constructing and using the same, although without attempting to set forth all of the forms in which it may be made, or all of the forms of its use, what I claim is:—

1. A trap nest comprising a casing having an opening therein, a nest box having one end pivotally supported within said casing, a trapping member for closing said opening, hooks secured to said casing to support said trapping member in open position, trip members independent of said supporting hooks and provided with means for raising the said trap member and moving the same forward to cause it to drop, and supporting links suspended from said trip members and supporting the free end of said nest box.

2. A trap nest comprising a casing having an opening therein, a nest box having one end pivotally supported within said casing, a trapping member for closing said opening, hooks secured to said casing to support said trapping member in open position, trip members pivoted to said casing and independent of said supporting hooks for raising said trap member and moving the same forward to cause it to drop, and supporting links suspended from said trip members and supporting the free end of said nest box.

3. A trap nest comprising a casing having an opening therein, a nest box having one end pivotally supported within said casing, a trapping member for closing said opening, hooks secured to said casing to support said trapping member in open position, trip members independent of said supporting hooks and provided with offset cam portions constructed to raise said trap member and move the same forward to cause it to drop, and supporting links suspended from said trip members and supporting the free end of said nest box.

4. A trap nest comprising a casing having an opening therein, a nest box having one end pivotally supported within said casing, a trapping member for closing said opening, hooks secured to said casing to support said trapping member in open position, trip members pivotally connected to said casing and provided at one end with offset cam portions for raising said trap member and moving the same forward to cause it to drop, springs supporting the other ends of said trip members, and means for suspending the free end of said nest box from said trip member.

5. A trap nest comprising a casing having an opening therein, a nest box having one end pivotally supported within said casing, a trapping member for closing said opening, hooks secured to said casing to support said trapping member in open position, trip members independent of said supporting hooks for raising the said trap member and moving the same forward to cause it to drop, and links connected to the free end of said nest box and provided with a hook portion passed over said trip members.

6. A trap nest comprising a casing having an opening therein, a nest box having one end pivotally supported within said casing, a trapping member for closing said opening, hooks secured to said casing to support said trapping member in open position, trip members pivoted to said casing and independent of said supporting hooks for raising said trap members and moving the same forward to cause it to drop, and links secured to the free end of said nest box and having hooked ends passed over said trip members.

7. A trap nest comprising a casing having an opening therein, a nest box having one end pivotally supported within said casing, a trapping member for closing said opening, hooks secured to said casing to support said trapping member in open position, trip members pivotally connected to said casing and provided at one end with offset cam portions for raising said trap member and moving the same forward to cause it to drop, springs supporting the other ends of said trip members, and links secured to the free end of said nest box and having hooked ends positioned over said trip member.

8. A trap nest comprising a casing having an opening therein, a nest box having one end pivotally supported within said casing, a trapping member for closing said opening, and provided with lateral pins, hooks supported by said casing and engaging said pins to support the trapping member in open position, trip members pivoted to said casing and independent of said hooks, said trip members having cam portions for raising said pins and moving the same forward to cause the tripping member to drop, and supporting links suspended from said trip members, and supporting the free end of said nest box.

9. A trap nest comprising a casing having an opening therein, a nest box pivotally supported within said casing, a trapping member constructed to close said opening, means for supporting said trapping member in open position, trip members connected with the nest box and provided with offset cam portions for disengaging said trapping member from said supporting means, and springs for returning said trip members to normal position when the weight on the nest box is removed.

In testimony whereof I have hereunto set my hand in presence of two subscribing witnesses.

FRANK J. SCHISLER.

Witnesses:
 WM. S. HODGES,
 M. E. SMITH.

---

Copies of this patent may be obtained for five cents each, by addressing the "Commissioner of Patents, Washington, D. C."